United States Patent [19]

Berenguer et al.

[11] Patent Number: 5,051,202

[45] Date of Patent: Sep. 24, 1991

[54] PROCESS FOR BLEACHING AND INCREASING THE ION-EXCHANGE CAPABILITY OF SEPIOLITE

[75] Inventors: Antonio A. Berenguer; Carlos B. Martin, both of Madrid, Spain

[73] Assignee: Tolsa, S.A., Madrid, Spain

[21] Appl. No.: 214,320

[22] Filed: Jul. 1, 1988

[30] Foreign Application Priority Data

Jul. 1, 1987 [ES] Spain .................................... 8701918

[51] Int. Cl.[5] .............................................. B01J 37/30

[52] U.S. Cl. ...................................... 252/184; 502/11; 502/12; 502/80; 502/84

[58] Field of Search ....................... 502/80, 84, 11, 12; 252/184

[56] References Cited

U.S. PATENT DOCUMENTS

| | | | |
|---|---|---|---|
| 2,793,219 | 5/1957 | Barrett et al. | 502/82 X |
| 2,793,220 | 5/1957 | Barrett et al. | 502/81 X |
| 2,892,800 | 6/1959 | Taipale | 502/82 |
| 3,873,585 | 3/1975 | Sturtwold et al. | 502/97.7 X |
| 4,049,685 | 9/1977 | Smith et al. | 260/412.5 |
| 4,110,356 | 8/1978 | Hodgson et al. | 260/412.5 |
| 4,285,832 | 8/1981 | Orth, Jr. | 502/80 |
| 4,542,002 | 9/1985 | Corma et al. | 502/11 |
| 4,740,488 | 4/1988 | Fogler et al. | 502/84 |

FOREIGN PATENT DOCUMENTS 56-152741 11/1981 Japan .

*Primary Examiner*—Deborah L. Kyle
*Assistant Examiner*—Valerie D. Fee
*Attorney, Agent, or Firm*—Reed Smith Shaw & McClay

[57] ABSTRACT

The present invention refers to a process for bleaching and increasing the ion-exchange capability of the sepiolite mineral, basically consisting of treating, at high pH and temperature, the sepiolite with a basic salt solution, which results in bleaching the starting material by dissolution of the organic material present in it, and in increasing the ion-exchange capability by a structural transformation of sepiolite. The bleaching can be optionally completed with a reduction treatment with sodium dithionite or with other reducing agents capable of reducing $Fe^{3+}$ to $Fe^{2+}$.

7 Claims, No Drawings

PROCESS FOR BLEACHING AND INCREASING THE ION-EXCHANGE CAPABILITY OF SEPIOLITE

TECHNICAL FIELD OF THE INVENTION

The present invention falls into the field of treatment of sepiolite with a basic salt, at high pH and temperature, so as to become bleached and to increase its ion-exchange capability.

PRIOR ART

Sepiolite is a mineral belonging to the clay family known as sepiolite-palygorskite. Sepiolite structure has been described by Nagy and Bradley (1955). Sepiolite is a hydrous magnesium silicate, with a fibrous structure, for which different structural formulas have been proposed, such as $Si_{12}O_{30}Mg_8H_x(OH)_y(H_2O)_z$, with stoichiometric variations in the number of protons, surface hydroxyl groups and crystallization water molecules, depending on the origin and taking into account the peculiar properties thereof.

Sepiolite fibrous structure consists of talc-like ribbons with two sheets of tetrahedral silica units, linked by means of oxygen atoms to a central sheet of magnesium, so that the tetrahedral sheet is continuous, but with the directions of the apical end of the silica tetrahedrons of the adjacent ribbons inverted. Each ribbon alternates with channels along the fibre axis. The octahedral cations which are present at the ribbon edges complete their coordination with water molecules (coordination water).

Additional water molecules are linked by hydrogen bonds to the coordination water, both at the outer surfaces and into the channels (zeolitic water).

Sepiolite has 8 octahedral cations for every half unit formula, usually occupied by 8 $Mg^{2+}$ ions following a trioctahedral model.

The tetrahedral sheet is mostly occupied by $Si^{4+}$ iones; although tetrahedral Al is present at a rate of 0.04- 0.48 for every 12 tetrahedral sites.

The charge deficiency is internally compensated for to a great extent, whereby the low values of the ion-exchange capability are mainly due to charge deficiencies on external surfaces.

Sepiolite, therefore, has channels along the fibre giving the former the appearance of a wall which alternatingly lacks bricks. The channel section is in the range of $3.8 \times 9.4$ Å.

Sepiolite has a color ranging from dark grey to light cream depending on the nature of the impurities present in the mineral. The main outstanding color responsible factors are the Fe, Mn and organic matter contents. The interest in bleaching sepiolite is obvious for a wide range of uses, wherein sepiolite use is restrained only due to color reasons. Among such applications, its use in paints, detergents, rubber, paper, etc., could be pointed up. There are a great number of processes for clay bleaching, especially for kaolin. They all basically coincide in dispersing the clay into an acid or weakly acid medium, treating it then with a reducing agent, mainly with sodium hydrosulfite, also with the possibility of using complex-forming agents to prevent from metal readsorption, mainly of Fe, dissolved by this method.

However, when trying to apply these processes to sepiolite bleaching, the results are negative, neither reduction, nor dissolution of the $Fe^{3+}$ present in sepiolite being attained. On the contrary, due to the acid pH at which the treatment is conducted, a part of the Mg of the octahedral sheet of the sepiolite, appreciably more soluble than Fe, dissolves, due to the Mg bigger capability of polarization, resulting in the collapsing and the total or partial destruction of the sepiolite structure.

Other clay-bleaching methods based on the use of electromagnetic separators, have not proved to be efficient in sepiolite bleaching.

One could also alternatively think of process for removing organic matter for bleaching the mineral, since the former is partially responsible for color. The aim of the customarily used methods is the oxidation of said organic matter with oxidants such as hydrogen peroxide. When said processes are applied to sepiolite, not only a color improvement is not obtained, but it notoriously worsens.

Such as it has already been pointed out, charge deficiencies of sepiolite are most compensated internally, wherefor it has a small ion-exchange capability, generally from 10 to 25 meq/100 g, mainly due to the charge deficiencies on external surfaces. Ion-exchange capability comes to be a highly interesting property of organic materials, as it makes their use possible in many applications. Thus, materials with high ion-exchange capabilities, such as zeolites, exchanger resins, clays, etc., are used for removing noxious cations in water purification; as cation sequestrants of detergents, for removing $Ca^{2+}$ and $Mg^{2+}$ cations which harden water and make washing difficult; for removing radioactive isotopes in sewage of nuclear plants, etc.

Other application for which ion-exchange capability is highly interesting, is the use as catalytic support, as this property enables the preparation of catalysts by cation-exchange techniques, which makes it possible to modify, depending on the exchanged cation, the catalytic properties of the materials, such as; acidity, pore size, stability, etc. Sepiolite is widely used nowadays as nickel, molybdenum, wolfram and cobalt support in catalysts of petroliferous fraction catalytic hydrotreatments, mainly in demetallization, as nickel, palladium and rhodium support in hydrogenation catalysts and, finally, it is also used as an ingredient in cracking catalyst dye.

Nowadays, said catalysts are usually prepared by impregnation techniques, less efficient than those of ion-exchange for multiple catalytic applications. For this reason, the increase in sepiolite ion-exchange capability would allow to increase sepiolite catalytic applications highly, mainly in the field of oil and its derivatives refining.

Different treatments are reported in the bibliography of sepiolite with sodium hydroxide, either at the atmospheric pressure or at higher pressures, wherein an increase in the ion-exchange capability is obtained. These treatments display, however, the following disadvantages:

In those treatments conducted at the atmospheric pressure, there is no dissolution of the organic matter, wherefor nor is it obtained an improvement in the mineral whiteness; on the contrary, there is a certain darkening of the mineral, probably due to the oxidation of $Fe^{2+}$ into $Fe^{3+}$.

In those treatments conducted at the atmospheric pressure, very high NaOH concentrations are needed, over 6 eq/1.

In those treatments conducted in an autoclave, under pressure, although lower NaOH concentrations (of about 2 eq/1) are needed and there is an improvement in the material whiteness, there is a dissolution of an important part of the silicon of the tetrahedral sheet of the sepiolite due to the excessively high values of pH and temperature. This results, on the one hand, in the obtention of a lower yield of the process, since a big part of the material dissolves in the reaction medium and, on the other, in a remarkable unstabilization of the material structure, which leads to a great loss of its crystallinity, a much more amorphous product with respect to the starting sepiolite being thereby obtained. This is a most important factor in a big number of catalytic applications, since crystallinity loss often involves notorious losses of catalytic activity and stability, as it happens, for instance, in the given case of cracking catalysts.

For that reason, the processes known until now for improving sepiolite whiteness and ion-exchange capability have not met important industrial applications, since, either they do not improve any of these properties, or they result in a marked deterioration of the crystalline structure of the material.

From all the above we could infer the interest of sepiolite bleaching and ion-exchange capability improvement for numerous applications as well as the fact that the methods usually used for clay bleaching come to be inefficient in the case of sepiolite, with important disadvantages in those methods developed for increasing ion-exchange capability, which has hindered up to now the use thereof on a large scale.

DISCLOSURE OF THE INVENTION

The present invention refers to a process for bleaching and increasing the ion-exchange capability of the sepiolite mineral, which overcomes the disadvantages of the prior art.

For the process according to the present invention, sepiolite or sepiolite mineral can be used, understanding as such that clay mineral containing sepiolite as major component, being allowed to be accompanied by other clays, feldspars, quartz, micas, etc. In order to obtain whiter products, the starting sepiolite should have a reflection index over the 50%, preferably over 70%.

Naturally, this reflection index can be lower than 50%, in case that it is the increase in the ion-exchange capability what is mainly intended to be achieved.

The process according to the present invention has the purpose to obtain the bleaching and increase in the ion-exchange capability of sepiolite, basically consisting of treating sepiolite with an aqueous solution of a basic salt, preferably calcium carbonate, or mixtures of various basic salts, with possibility to additionally incorporate small amounts of alkaline or ammonium hydroxides. Said solution must have a basic salt concentration ranging from 0.1N to 10N, preferably from 0.5N to 6N, and a sepiolite concentration ranging from 1% to 50% by weight, preferably from 3% to 20%. The amounts of hydroxides to be added should be such that their concentrations in the medium range from 0 to 0.5N, preferably from 0 to 0.3N.

Alternatively, instead of water, any other polar liquid can be used as reaction medium, such as ethylene glycol, acetone, methanol, ethanol, methylethylketone, isopropanol, etc.

Treatment of sepiolite with said solution must be conducted at a high temperature, over 50° C. and preferably over 100° C. Likewise, said treatment should be preferably conducted in an autoclave, at a pressure over the atmospheric one, preferably between 2 and 50 atmospheres. The treatment time is inversely proportional to the temperature used, being able to range from 1 minute to 8 days, preferably from 30 minutes to 6 hours, if the reaction is conducted under pressure in autoclave.

When this treatment is over, the obtained dispersion is filtered and filtration waters are collected with a more or less dark color, depending on the nature of the sepiolite to be treated and on the more or less energetic character of the treatment; as well as a solid which, once it has been washed for several times with water or with any other polar liquid of those above mentioned, is dried by means of any conventional drying process: in a stove, in the environmental atmosphere, by an air flow, by lyophilization, under vacuum, in spray dryer, on fluidized bed, etc.

Likewise, separation of the solid from the filtration waters can be carried out by other processes than filtration, such as decantation or centrifugation. So as to make solid separation easier, both from the reaction medium and from the washing waters, small amounts of flocculants or of different salts acting as such can be added. Among the different products which can be used for this purpose, the following can be quoted: organic polymers, sodium chloride, magnesium chloride, aluminium chloride, calcium chloride, aluminium nitrate, ferric chloride, ferric sulphate, calcium hydroxide, magnesium hydroxide, aluminium sulphate, aluminium polyhydroxides, aluminium polyhydroxychlorides, etc.

The product obtained by the process according to the present invention shows a whiteness noticeably higher than that of the starting sepiolite, expressed as reflection index. In case one wishes to further improve the whiteness of this product, the treatment can be completed with a bleaching process of the conventional type, similar to that used for bleaching other clays, particularly kaolin, which are reported in the bibliography. For the sake of instance, a typical treatment of this type could consist of contacting the obtained material and an acid solution of a reducing agent, preferably sodium dithionite, with the possibility to add, besides, to the reaction medium, some organic polyfunctional water-soluble compound able to form a complex with iron. It should be noted that said treatment applied to natural sepiolite does not produce any bleaching of the starting material; whilst, when applied to sepiolite which has previously been bleached by the process disclosed in the present invention, there is a new additional increase in the material whiteness.

During the treatment as described, different modifications of the chemical composition and of the sepiolite structure take place. First of all, there is a slight displacement of some of the picks of the X Ray diffractogram, which shows an increase, during treatment, in the spacing of some of the crystallographic planes corresponding to sepiolite. Table I shows the data corresponding to a typical X Ray diffractogram of the obtained product, as well as of the starting sepiolite and of the natural mineral called Loughlinite. As it can be seen, there is an excellent concordance between the data of the obtained material and those of Loughlinite, for which reason, sepiolite was transformed, presumably, during treatment into Loughlinite, this being a mineral which, on the other hand, is extraordinarily scarce in nature.

TABLE I

X Ray Diffraction Data of the Obtained Material, of Starting Sepiolite and of Natural Loughlinite.

| Obtained Material | | Sepiolite | | Loughlinite | |
|---|---|---|---|---|---|
| Spacing (A) | Intensity | Spacing (A) | Intensity | Spacing (A) | Intensity |
| 12.9 | 100 | 12.1 | 100 | 12.9 | 100 |
| 7,66 | 5 | 7.5 | 3 | 7.63 | 5 |
| — | — | 6.7 | 4 | — | — |
| 4.85 | 5 | — | — | 4.81 | 5 |
| 4.48 | 13 | 4.49 | 9 | 4.51 | 7 |
| 4.36 | 18 | 4.29 | 14 | 4.34 | 18 |
| 3.80 | 9 | 3.74 | 10 | 3.83 | 6 |
| 3.60 | 9 | — | — | 3.63 | 7 |
| 3.32 | 5 | 3.34 | 14 | 3.31 | 5 |
| — | — | 3.18 | 7 | — | — |

As far as the chemical composition is concerned, Table II shows a typical chemical analysis of a material obtained according to the present process of the invention, compared with the sepiolite used for its preparation. It can be seen that there is a notorious increase in the amount of sodium present in the material, of about a 7%. This sodium is capable of being exchanged with other cations, thus being responsible for the increase in the ion-exchange capability. Said materials show very much high ion-exchange capabilities, in all cases over 100 meq/100 g, very much higher than the exchange capability of natural sepiolite.

TABLE II

Typical Chemical Analysis of the Obtained Materials and of Starting Sepiolite.

| | Obtained Material | Sepiolite |
|---|---|---|
| $SiO_2$ | 59.0 | 63.5 |
| $Al_2O_3$ | 1.1 | 1.1 |
| MgO | 21.5 | 23.4 |
| CaO | 0.2 | 0.2 |
| $Fe_2O_3$ | 0.6 | 0.7 |
| $Na_2O$ | 7.1 | 0.3 |
| $K_2O$ | 0.2 | 0.4 |
| C.L.* | 10.1 | 10.3 |

*Calcination Losses

Comparison being made to the existing methods for improving the ion-exchange capability on the basis of the treatment with NaOH at high temperatures and pressures, a smaller loss of crystallinity of the starting sepiolite is observed, highly crystalline materials and a smaller dissolution of the silicon of the tetrahedral sheet of sepiolite being obtained. This becomes clear mainly by two facts: firstly, by the height of picks in the X Ray diffractogram, which is much higher in the materials treated according to the present process than in those treated with sodium hydroxide according to the prior art; and, secondly, by the analysis of the filtrate of the reaction medium, wherein low silicon concentrations are detected, ranging from 100 to 200 ppm, in the case of the process according to the present invention, whilst, when the treatment is conducted in similar conditions with NaOH, silicon concentration in the filtrate is over 2000 ppm.

On the other hand, the process according to the present invention not only does not involve a higher cost with respect to the treatment of sepiolite with sodium hydroxide, but, as it is carried out with basic salts, preferably sodium carbonate, and as it is a much cheaper product than said hydroxide, it involves an important saving in the cost of the reagents used in the process. Besides that, as, according to the present process, there is a smaller dissolution of the silicon, the yield of the process is higher if compared with the alternative processes, as the loss of raw matter by dissolution in the reaction medium is prevented from.

Among the basic salts which can be used according to the present process, the following can be cited: sodium carbonate, sodium bicarbonate, potassium carbonate, tetrasodium pyrophosphate, sodium acetate, etc. Such as it has already been mentioned, the pH of the reaction medium must be high for the dissolution of the organic matter to take place, for which small amounts of metal hydroxides of ammonium hydroxide can be added. Nevertheless, it is advisable to use minimum hydroxide concentrations, because, on the contrary, they would result in the dissolution of a big part of the silicon of the sepiolite tetrahedral sheet.

In order to obtain optimum whiteness degrees, it is advisable for the mineral not to contact with the metal parts of the used machinery during all stages of the process and, particularly, during its grinding and preparation, since it could produce contaminations due to the mineral abrasion, which would damage the whiteness of the final products. Due to this reason, it is advisable to use ceramic machinery and mills, or machinery and mills coated with teflon or with any other protecting material, in order to avoid contact between sepiolite and metal.

WAYS OF EMBODIMENT OF THE INVENTION

A series of examples illustrating the present invention are hereinafter detailed. Example 5, corresponding to a process for increasing the ion-exchange capability according to the prior art, has been included herein for comparison purposes.

EXAMPLE 1

Sepiolite mineral from Vallecas (Madrid) with a content in sepiolite of 90%, with a whiteness expressed as reflection index of 67%, an ion-exchange capability of 15 meq/100 g, a X-Ray diffractogram corresponding to that shown in Table I and a chemical analysis expressed as metal oxides, as indicated ianTable III, was ground in a ceramic ball mill up to a particle size smaller than 74 um. 100 g of this mineral were then dispersed into 1 liter of a 6N $CO_3Na_2$ solution. Dispersion was carried out by stirring for 5 minutes in a Cowles-type stirrer at 1500 rpm. The thus obtained dispersion was introduced into an autoclave and treated for 4 hours at 200° C. under autogenous pressure. The product was filtered, washed up to 6 times with deionized water and then dried in a forced air stove, at 100° C. The obtained product has a reflection index of 74% and an ion-exchange capability of 143 meq/100 g, a X-Ray diffractogram such as that indicated in Table I; the rest of the characteristics appearing shown in Table III.

EXAMPLE 2

The starting material used in Example 1 was submitted to a treatment identical to that of said example with a 2N $CO_3Na_2$ solution. Results are shown in Table III.

EXAMPLE 3

One hundred grams of the starting material of Example 1 were treated with a liter of 4N $CO_3Na_2$ solution and 4 g of NaOH were added in an autoclave under similar conditions as those of Example 1. The obtained product shows a reflection index of 76% and an ion-exchange capability of 196 meq/100 g.

EXAMPLE 4

Example 3 was repeated with addition of 5.6 g of KOH instead of NaOH, maintaining the $CO_3Na_2$ solution concentration and the rest of the operation conditions. The obtained product, the characteristics of which are summarized in Table III, presents a reflection index of 75% and an ion exchange capability of 177 meq/100 g.

EXAMPLE 5

100 g of the starting sepiolite of Example 1 were dispersed into 1 liter of an aqueous solution containing 40 g NaOH. The dispersion was treated in autoclave at 190° C. for 4 hours. The product, once filtered, washed and dried, presents the characteristics indicated in Table III.

From the comparison of the results shown in Table II, it can be seen that the material obtained in Example 5 presents a whiteness and an ion-exchange capability similar to those of the other examples, but it has however undergone a greater dissolution of the tetrahedral silicon, as proved by the lower content in $SiO_2$ detected in the chemical analysis. On the other hand, the X-Ray diffractogram obtained with this material, although it basically coincides with that indicated in Table I, presents a lower crystallinity with respect to the other materials, doubtlessly due to the dissolution of a bigger amount of Si having been produced in the present Example.

EXAMPLE 6

Ten grams of the material obtained in Example 1 are dispersed into a liter of a solution containing 0.5 g sodium hydrosulphite, 0.03 g potassium aluminium sulphate, 0.5 g mercaptoacetic acid, 7 g sodium oxalate and 7 g oxalic acid. This solution was previously degasified in ultrasound bath for 20 minutes. The dispersion is treated at 80° C. for 60 minutes in a reactor provided with stirring. It is then filtered and washed with 0.1N oxalic acid and further with deionized water until reaching a slightly alkaline pH. The reflection index of the obtained product, once it has been dried and ground comes to be 80%.

With the application of this treatment to the starting sepiolite or sepiolite mineral, there would not be a noticeable improvement in the whiteness of the final product, because the process, according to the present invention, produces an alteration of the structure of the starting material which makes it capable of being submitted to the conventional clay-bleaching treatment with reducing agents.

TABLE III

| Characteristics of the Obtained Materials. | Natural Sepiolite | Examp. 1 | Examp. 2 | Examp. 3 | Examp. 4 | Examp. 5 |
|---|---|---|---|---|---|---|
| Solution | | | | | | |
| $CO_3Na_2$ | — | 6N | 2N | 4N | 4N | — |
| NaOH | — | — | — | 0.1N | — | 2N |
| KOH | — | — | — | — | 0.1N | — |
| Reflection Index (%) | 67 | 74 | 75 | 76 | 75 | 76 |
| Ion-Exchange Capability (meq/100 g) | 16 | 153 | 146 | 186 | 162 | 132 |
| Chemical Analysis (%) | | | | | | |
| $SiO_2$ | 63.5 | 59.0 | 59.0 | 58.0 | 58.0 | 56.0 |
| $Al_2O_3$ | 1.1 | 1.1 | 1.5 | 1.3 | 1.3 | 1.3 |
| MgO | 23.4 | 21.5 | 23.0 | 22.0 | 22.5 | 24.4 |
| CaO | 0.2 | 0.2 | 0.3 | 0.2 | 0.2 | 0.3 |
| $Fe_2O_3$ | 0.7 | 0.6 | 0.5 | 0.4 | 0.6 | 0.5 |
| $Na_2O_3$ | 0.3 | 7.1 | 6.3 | 7.5 | 7.0 | 6.5 |
| $K_2O$ | 0.4 | 0.2 | 0.2 | 0.1 | 0.4 | 0.1 |
| C.L.* | 10.3 | 10.1 | 9.4 | 10.4 | 10.3 | 11.2 |
| TOTAL | 99.9 | 99.8 | 100.2 | 99.6 | 100.3 | 100.3 |

*Calcination Losses at 1100° C.

We claim:

1. A process for bleaching and increasing the ion exchange capability of sepiolite, thereby obtaining products with an X-Ray diffractogram different from that of the starting sepiolite, said obtained products being capable of ion-exchange with cations of metals of the groups Ia, IIa, IIIa, IVa, Va, VIa, VIIa, VIIIa, Ib, IIb and IIIb, as well as with $NH^{4+}$ and, $H^+$ cations, comprising treating said sepiolite with aqueous solutions of sodium carbonate or other basic salt, selected from the group consisting of sodium bicarbonate, potassium bicarbonate, tetrasodium pyrophosphate or sodium acetate at a temperature over about 100° C. and at a pressure over about one atmosphere where said solution has a basic salt concentration ranging between about 0.1N and about 10N and a sepiolite concentration between about 1% and about 50% by weight.

2. A process for bleaching and increasing the ion exchange capability of sepiolite, according to claim 1, further including the step of adding small amounts of an alkaline or ammonium hydroxide where said hydroxide added to said solution has a concentration less than about 0.5N.

3. A process for bleaching and increasing the ion exchange capability of sepiolite, according to claim 2, wherein said aqueous solutions include solvents selected from the group consisting of water or other polar liquids.

4. A process for bleaching and increasing the ion exchange capability of sepiolite, according to claim 3, characterized in that said obtained product is submitted to an additional bleaching treatment with an aqueous solution of a reducing agent capable of reducing the $Fe^{3+}$ impurities of the clay into $Fe^{2+}$.

5. A process for bleaching and increasing the ion exchange capability of sepiolite, according to claim 4, characterized in that, together with the reducing agent, a $Fe^{2+}$ complex-forming agent is added.

6. A process for bleaching and increasing the ion exchange capability of sepiolite, according to claim 5, characterized in that said additional treatment is conducted at an acid pH.

7. A process for bleaching and increasing the ion exchange capability of sepiolite, according to claim 4, wherein said reducing agent is sodium hyrosulphite.

* * * * *